US010560756B2

(12) United States Patent
Aitken et al.

(10) Patent No.: US 10,560,756 B2
(45) Date of Patent: *Feb. 11, 2020

(54) TERRESTRIAL BROADCAST MARKET EXCHANGE NETWORK PLATFORM AND BROADCAST AUGMENTATION CHANNELS FOR HYBRID BROADCASTING IN THE INTERNET AGE

(71) Applicant: SINCLAIR BROADCAST GROUP, INC., Hunt Valley, MD (US)

(72) Inventors: Mark A. Aitken, Parkton, MD (US); Michael J. Simon, Frederick, MD (US)

(73) Assignee: Sinclair Broadcast Group, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,852

(22) Filed: Nov. 10, 2017

(65) Prior Publication Data

US 2018/0098132 A1 Apr. 5, 2018

Related U.S. Application Data

(63) Continuation of application No. 14/092,993, filed on Nov. 28, 2013, now Pat. No. 9,843,845.

(Continued)

(51) Int. Cl.
*H04N 7/025* (2006.01)
*H04N 21/643* (2011.01)
(Continued)

(52) U.S. Cl.
CPC .... *H04N 21/64322* (2013.01); *H04H 20/423* (2013.01); *H04N 21/2381* (2013.01); *H04N 21/6112* (2013.01)

(58) Field of Classification Search
CPC ......... H04N 21/64322; H04N 21/2381; H04N 21/6112
(Continued)

(56) References Cited

U.S. PATENT DOCUMENTS 6,498,937 B1 12/2002 Smith
6,961,388 B2 11/2005 Ling et al.
(Continued)

FOREIGN PATENT DOCUMENTS

CN 105007145 A 10/2015
CN 105007146 A 10/2015
(Continued)

OTHER PUBLICATIONS

English translation for Chinese patent publication No. CN 105007145 A, published Oct. 28, 2015, 17 pages, translated by Google at https://patents.google.com.
(Continued)

*Primary Examiner* — Jivka A Rabovianski
(74) *Attorney, Agent, or Firm* — Sterne, Kessler, Goldstein & Fox P.L.L.C.

(57) ABSTRACT

A new television broadcast model called a Broadcast Market Exchange (BMX) eliminates the inefficiency in spectrum usage, providing maximum flexibility in delivering content through either VHF (for fixed location receiving devices) or UHF (optimized for mobile receiving devices) transmission/propagation. In conjunction with the BMX, a wireless communications system architecture is provided to enable a broadcast augmentation channel. The augmentation channel provides supplementation of the Quality of Service (QoS) of a one way User Datagram Protocol (UDP) delivery environment. The augmentation channel may be comprised of one or more physical delivery mechanisms (wired or wireless), but can be effectively unified for increasing QoS and
(Continued)

or scalable levels of service (additional essence) to improve the user experience.

20 Claims, 14 Drawing Sheets

Related U.S. Application Data

(60) Provisional application No. 61/882,700, filed on Sep. 26, 2013, provisional application No. 61/730,596, filed on Nov. 28, 2012.

(51) Int. Cl.
*H04N 21/2381* (2011.01)
*H04N 21/61* (2011.01)
*H04H 20/42* (2008.01)

(58) Field of Classification Search
USPC .......................................................... 725/33
See application file for complete search history.

(56) References Cited

U.S. PATENT DOCUMENTS

| | | | |
|---|---|---|---|
| 7,920,884 B2 | 4/2011 | Agrawal et al. | |
| 8,151,305 B2 | 4/2012 | Doerr et al. | |
| 8,577,299 B2 | 11/2013 | Agrawal et al. | |
| 8,804,675 B2 | 8/2014 | Gutierrez et al. | |
| 9,036,567 B2 | 5/2015 | Krishnmoorthi et al. | |
| 9,043,687 B2 | 5/2015 | Ko et al. | |
| 9,179,440 B2 | 11/2015 | Gutierrez et al. | |
| 9,253,428 B2 | 2/2016 | Allison, III et al. | |
| 9,258,800 B2 | 2/2016 | Kwak et al. | |
| 9,300,327 B2 | 3/2016 | Ko et al. | |
| 9,307,273 B2 | 4/2016 | Yoo et al. | |
| 9,363,040 B2 | 6/2016 | Ko et al. | |
| 9,369,325 B2 | 6/2016 | Kim et al. | |
| 9,386,562 B2 | 7/2016 | Gutierrez et al. | |
| 9,740,513 B2 | 8/2017 | Gatherer et al. | |
| 9,843,845 B2 | 12/2017 | Aitken et al. | |
| 2003/0058890 A1 | 3/2003 | Ritchie, Jr. et al. | |
| 2006/0117341 A1 | 6/2006 | Park | |
| 2009/0163137 A1* | 6/2009 | Capparelli | H04H 60/06 455/3.06 |
| 2010/0195558 A1* | 8/2010 | Koskinen | H04L 41/5019 370/312 |
| 2011/0107379 A1 | 5/2011 | Lajoie et al. | |
| 2012/0188878 A1 | 7/2012 | Simon | |
| 2013/0023285 A1* | 1/2013 | Markhovsky | G01S 3/74 455/456.1 |
| 2013/0024364 A1 | 1/2013 | Shrivastava et al. | |
| 2013/0170561 A1 | 7/2013 | Hannuksela | |
| 2014/0112274 A1 | 4/2014 | Moon et al. | |
| 2014/0150014 A1 | 5/2014 | Aitken et al. | |
| 2015/0006586 A1 | 1/2015 | Mourad et al. | |
| 2015/0043491 A1 | 2/2015 | Eng et al. | |
| 2015/0049642 A1 | 2/2015 | Eng et al. | |
| 2015/0055727 A1 | 2/2015 | Kim et al. | |
| 2015/0085735 A1 | 3/2015 | Shelby et al. | |
| 2015/0181281 A1 | 6/2015 | Ko et al. | |
| 2015/0195067 A1 | 7/2015 | Kim et al. | |
| 2015/0236884 A1 | 8/2015 | Suh et al. | |
| 2015/0304070 A1 | 10/2015 | Baek et al. | |
| 2015/0326448 A1 | 11/2015 | Chaudhary et al. | |
| 2015/0358106 A1 | 12/2015 | Limberg et al. | |
| 2016/0057504 A1 | 2/2016 | Shelby et al. | |
| 2016/0094970 A1 | 3/2016 | Oh et al. | |
| 2016/0105223 A1 | 4/2016 | Baek et al. | |
| 2016/0119908 A1 | 4/2016 | Kwak et al. | |
| 2016/0127169 A1 | 5/2016 | Rosa de Sousa Teixeira et al. | |
| 2016/0164541 A1 | 6/2016 | Ko et al. | |
| 2016/0164637 A1 | 6/2016 | Suh et al. | |
| 2016/0165273 A1 | 6/2016 | Moon et al. | |
| 2016/0165274 A1 | 6/2016 | Moon et al. | |
| 2016/0173312 A1 | 6/2016 | Moon et al. | |
| 2016/0191288 A1 | 6/2016 | Baek et al. | |
| 2016/0198217 A1 | 7/2016 | Ko et al. | |
| 2016/0212626 A1 | 7/2016 | Simon et al. | |
| 2016/0241358 A1 | 8/2016 | Ko et al. | |
| 2016/0241365 A1 | 8/2016 | Bae et al. | |
| 2016/0328252 A1 | 11/2016 | Singh et al. | |
| 2017/0230267 A1 | 8/2017 | Armolavicius et al. | |
| 2017/0295409 A1 | 10/2017 | Simon et al. | |

FOREIGN PATENT DOCUMENTS

| | | |
|---|---|---|
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |
| WO | WO 2015/187965 A1 | 12/2015 |

OTHER PUBLICATIONS

English translation for Chinese patent publication No. CN 105007146 A, published Oct. 28, 2015, 17 pages, translated by Google at https://patents.google.com.

English translation for Chinese patent publication No. CN 105024791 A, published Nov. 4, 2015, 14 pages, translated by Google at https://patents.google.com.

English translation for Chinese patent publication No. CN 105024952 A, published Nov. 4, 2015, 20 pages, translated by Google at https://patents.google.com.

English translation for Chinese patent publication No. CN 105024963 A, published Nov. 4, 2015, 23 pages, translated by Google at https://patents.google.com.

English translation for Chinese patent publication No. CN 105245479 A, published Jan. 13, 2016, 28 pages, translated by Google at https://patents.google.com.

English translation for Chinese patent publication No. CN 105282076 A, published Jan. 27, 2016, 21 pages, translated by Google at https://patents.google.com.

English translation for Chinese patent publication No. CN 105282078 A, published Jan. 27, 2016, 24 pages, translated by Google at https://patents.google.com.

English translation for Chinese patent publication No. CN 105323048 A, published Feb. 10, 2016, 26 pages, translated by Google at https://patents.google.com.

English translation for Chinese patent publication No. CN 105743624 A, published Jul. 6, 2016, 38 pages, translated by Google at https://patents.google.com.

English translation for Chinese patent publication No. CN 105991266 A, published Oct. 5, 2016, 29 pages, translated by Google at https://patents.google.com.

English translation for Chinese patent publication No. CN 105991495 A, published Oct. 5, 2016, 21 pages, translated by Google at https://patents.google.com.

English translation for Chinese patent publication No. CN 105991498 A, published Oct. 5, 2016, 56 pages, translated by Google at https://patents.google.com.

English translation for Chinese patent publication No. CN 105991500 A, published Oct. 5, 2016, 40 pages, translated by Google at https://patents.google.com.

English translation for Chinese patent publication No. CN 105991501 A, published Oct. 5, 2016, 44 pages, translated by Google at https://patents.google.com.

(56) References Cited

OTHER PUBLICATIONS

English translation for Chinese patent publication No. CN 105991502 A, published Oct. 5, 2016, 25 pages, translated by Google at https://patents.google.com.

Earnshaw, M. et al.,"Physical Layer Framing for ATSC 3.0," *IEEE Transactions on Broadcasting*, vol. 62, No. 1, Mar. 2016, pp. 263-270.

Gómez-Barquero, D. and Caldwell, M.W., "Broadcast Television Spectrum Incentive Auctions in the U.S.: Trends, Challenges, and Opportunities," *IEEE Communications Magazine*, vol. 53, No. 7, Jul. 2015, pp. 50-56.

He, D. et al., "System Discovery and Signaling Transmission Using Bootstrap in ATSC 3.0," *IEEE Transactions on Broadcasting*, vol. 62, No. 1, Mar. 2016, pp. 172-180.

Simon, M. and Aitken, M., "An Overview of the North American ATSC M/H Mobile Broadcasting System and Its Next-Generation ATSC 3.0," in *Next Generation Mobile Broadcasting*, Boca Raton, FL, USA: CRC Press, 2013, pp. 91-121.

International Search Report and Written Opinion, dated Jul. 17, 2017, for PCT Appl. No. PCT/US2017/026368, 11 pages.

\* cited by examiner

| BW MHz | Sampling Frequency (MHz) | ΔF (kHz) | FFT | TU (μs) | CP (μs) | # NGB Symbols 10ms Frame |
|---|---|---|---|---|---|---|
| 5,6,10,12 | 12.288 | 2 | 6144 | 500 | 55.58 | 18 |
| 5,6,10,12 | 12.288 | 1.33 | 9216 | 750 | 83.33 | 12 |
| 5,6,10,12 | 12.288 | 1 | 12288 | 1000 | 111.16 | 9 |
| 5,6,10,12 | 12.288 | .67 | 18432 | 1500 | 166.66 | 6 |

NGBP Constant Sampling Frequency Integer # Symbols per Frame

Figure 5

TERRESTRIAL BROADCAST MARKET EXCHANGE NETWORK PLATFORM AND BROADCAST AUGMENTATION CHANNELS FOR HYBRID BROADCASTING IN THE INTERNET AGE

CROSS-REFERENCE TO RELATED APPLICATIONS AND CLAIM FOR PRIORITY

This application is a continuation of copending U.S. patent application Ser. No. 14/092,993 filed on Nov. 28, 2013, which claims priority to provisional application Ser. No. 61/730,596 filed Nov. 28, 2012 and provisional application Ser. No. 61/882,700 filed Sep. 26, 2013, the contents of which are incorporated herein by reference in their entirety.

BACKGROUND OF THE INVENTION

The present invention relates generally to terrestrial television broadcast networks, and in particular relates to a new paradigm for terrestrial broadcasting in the Internet Age.

The United States had the honor of being the first country to develop and adopt a Digital TV system. In fact when the United States embarked on exploring the opportunities for an "Advanced Television" standard, the world was still largely analog. Since that time, however, the advances in technology and the maturing of the Internet have presented serious challenges to the continued competitiveness and relevance of traditional terrestrial broadcasting in the 21st century.

Today many countries have already adopted and even deployed a second generation terrestrial DTV standard. None of these are IP Network centric or aware in nature, and little or no thought was given to interworking with other IP based communication networks. They effectively exist as islands in the internet age. The ATSC is now considering a non-backwardly compatible next generation DTV Standard, ATSC 3.0. ATSC's 8-VSB (A/53), the first generation modulation method used for broadcast in the ATSC digital television standard, is monolithic in purpose and very inflexible, therefore driving a non-backwardly compatible solution being sought. Today the art of 'being digital' is the norm and is expected by consumers, the PC is being displaced by computing tablets and smartphone devices attached to a world-wide IP network of cloud servers that are always connected. The present inventors believe that a real opportunity exists to create a new paradigm that is truly useful for the continued existence of terrestrial broadcasting in the Internet Age.

Terrestrial broadcasting today is a "one-shot" event with a signal transmitted from an isolated island (non IP Network aware) transmitter that emits a radio wave with hopes that the signal will be received somewhere inside a geographically limited coverage area and the content viewed by someone. In the current broadcast model (last 60 years), a broadcaster occupies an entire broadcast channel (e.g., 6 MHz in the USA) for its exclusive use 24.times.7 even though, for many TV stations, a small number of programs generate the majority of revenue and profit using the current monolithic standard. The viewing tally (i.e. ratings) is done statistically with insignificant numerical data, in non-real-time and is reported to the broadcaster by an independent entity sometime in the future (e.g. the next day). In the age of Big Data, it is mission critical to have a deep knowledge of one's audience and real-time analytics, which for instance drives targeted advertisements and/or new forms of local news and engaging entertainment, etc. These are features commensurate with the capabilities of the broadcast Virtualized IP Core network to be discussed and are relevant in today's media content provider environment.

Some local broadcasters are dabbling with web sites and social media networks and even online streaming of content to augment and adapt to the internet age, but largely this activity is independent of their core economic drivers. But instead of this independent dabbling, what is really needed is a focused "holistic" approach to the development of a new terrestrial DTV Standard and platform that closely integrates and harmonizes broadcasting and the Internet (Web). The objective of making content easy to receive on multiple device types over various delivery channels and physical 'bearer' layers and synchronously presented today as native HTML5 elements (Video/Audio, etc.) of a web browser using extensions to W3C web technology is essential. As well, the ability to evolve as these other delivery channels and physical 'bearer' layers evolve becomes essential. This requires changes to the traditional broadcast architecture which needs to include elements such as the inclusion of a virtualized IP Core network. To enable a cost-effective, consumer friendly and viable new eco-system, the virtualized IP Core network may well become a shared entity of the broadcasters in a market or region of the country. The IP Core network abstracts the complexity of the physical radio layer (which also can be shared efficiently) and enables broadcasters to remain totally independent (virtualized) and competitive but able to share in the advantages of a malleable virtualized IP core network fabric and take a giant step forward as an industry to offer services that are more consumer friendly. Nowadays, consumers do not care how content is delivered. Rather, consumers just want to have easy and ubiquitous access to content on a variety of devices using technology that keeps pace with, and uses the same web tools as, the Internet.

SUMMARY OF THE INVENTION

Terrestrial DTV technology and the network architecture as we know it today must change fundamentally and moreover be harmonized with a virtualized IP Core network (disclosed herein) for broadcasters to remain competitive, relevant and perhaps most importantly, to grow their business in the Internet Age. Some of the basic IP Core technology and concepts underlying the present invention exists today and is mature and is responsible for driving the mobile 3GPP LTE broadband revolution in the world today.

In accordance with one aspect of the invention, a new IP Core network architecture entity herein termed a 'Broadcast Market Exchange' (BMX) eliminates possible inefficiencies in spectrum usage, providing maximum flexibility in delivering content through either the VHF broadcast band (more optimal for fixed location receiving devices) or the UHF broadcast band (optimized or more optimal for nomadic and or mobile receiving devices). This allows most effective use of, and maximizes the real value and revenue potential of, the available broadcast spectrum for broadcasters using the services of a new virtualized IP core network under control of the intelligence in a BMX entity.

The BMX entity (a node in the IP Core network) efficiently manages all broadcast physical layer resources and liberates additional bandwidth in a spectrum pool it is managing for broadcasters in a market and or region of country. A BMX market-driven mechanism (software algorithm) is used to schedule shared resources in the most efficient way. As only one example, broadcasters may choose to broadcast content during prime time hours, thus freeing up spectrum capacity in the spectrum exchange pool for wholesale bit use by other broadcasters and or other users in a market driven manner during daytime hours to generate additional revenue using the BMX. The BMX entity effectively repacks (schedules resources) of the broadcast spectrum to deliver content efficiently for its broadcasters in the pool and allocates surplus spectrum for other applications, which could include applications such as 4G data offload for wireless carriers, non-real time data delivery, a content/data delivery mechanism for non-broadcaster content providers, public services, OTT content owners, etc. The wholesale open market driven use of spectrum becomes possible.

Unlike spectrum repacking through a governmental regulatory agency such as the FCC, that requires a long, drawn-out rulemaking process and then some kind of regulatory enforcement, the centralized and coordinated spectrum repacking (resource management) performed by the BMX is dynamic and market-driven. The proficiencies of the BMX real-time dynamic spectrum management is that highly valuable surplus spectrum is liberated and associated with a user in need of broadcast capacity in an open market exchange.

From the user's perspective, the conventional notion of tuning in to a TV channel becomes irrelevant. What is essential is the discovery of content. For example, by invoking an application "App" in a HTML5 receiving device which utilizes low level signaling embedded dynamically in emitted RF signal by the IP Core network, the user is presented an interface with a list of programming/content from which he/she can choose without any reference to a fixed channel number. The dynamic allocation of spectrum resources for content delivery by the BMX entity means that the notion of the TV channel (fixed place in broadcast RF spectrum) over which a content stream is delivered may change from time to time and virtualized (could be shifted to open bandwidth for another services for example), including seamless handoff between channels and/or between broadcast and broadband infrastructure. All this is abstracted and remains transparent to the user.

In accordance with another aspect of the invention, and as a means of example, the latest in MPEG media encoding and MPEG Media Transport (MMT) may be used, including MPEG-H, formally known as ISO/IEC 23008 under development by the ISO/IEC Moving Pictures Expert Group (MPEG). MMT is an application layer transport for media content that operates over IP and is harmonized with W3C and HTML5 for media presentation in heterogeneous networks. HTML5 is the latest revision of HTML (Hyper Text Markup Language), a markup language to present content on IP devices such as computers, tablets and cell phones. The goal of HTML5 is to support multimedia content in a browser environment without plugins thus making the platform more ubiquitous. HTML5 offers the promise of reaching every potential viewer on every hardware platform with uniformly authored multimedia content, and without the need to develop and support platform-specific apps and or plug-ins. The missing piece or problem of MMT in a heterogeneous network comprised of a terrestrial broadcast and broadband unicast channel (wire/wireless) is there must always be a unicast channel available to provide the essential MMT network timing information based on a UTC timeline for media presentation under HTML5. The current unacceptable constraint is a broadcast only delivery channel may not be supported by MMT since it is dependent on unicast for timing.

In accordance with another aspect of the invention, a new MMT timing mechanism is introduced that uses only the broadcast terrestrial channel with no dependency on an internet (Wi-Fi, LTE, etc.) connection at the receiving device required to receive timed multimedia content under MMT. This brings much more freedom and flexibility by having a pure terrestrial broadcast only (TV anywhere) experience using MMT and W3C web tools for presentation.

In accordance with another aspect of the invention, when a broadcast receiving device has an internet (Wi-Fi, LTE, etc.) connection, a more rich content experience for the user can result under control of the managed virtualized IP Core network to provide augmentation channel data. The augmentation channel may be comprised of one or more physical delivery mechanisms (wired or wireless) in a heterogeneous network environment that can be effectively unified for increasing QoS and or scalable levels of service (additional essence) to improve the user experience.

In accordance with another aspect of the invention, broadcast data essence is pushed in a defined, controlled systematic fashion as discrete segments and broadcast under MMT. Data essence can also be pulled as discrete segments from a HTTP server under MPEG-DASH and combined in the broadcast client of receiver under control of the broadcaster IP Core network. This enables convergence of both broadcast (Push) and (Pull) on demand IP services seamlessly in a next gen broadcast platform in the internet age.

BRIEF DESCRIPTION OF THE DRAWINGS

The invention will become more readily understood from the detailed description provided hereinafter with reference to the accompanying drawings, wherein:

FIG. 5 is a table showing an example of required NGBP OFDM parameters resulting in an integer number of symbols per frame;

DETAILED DESCRIPTION OF THE INVENTION

Figure 1:
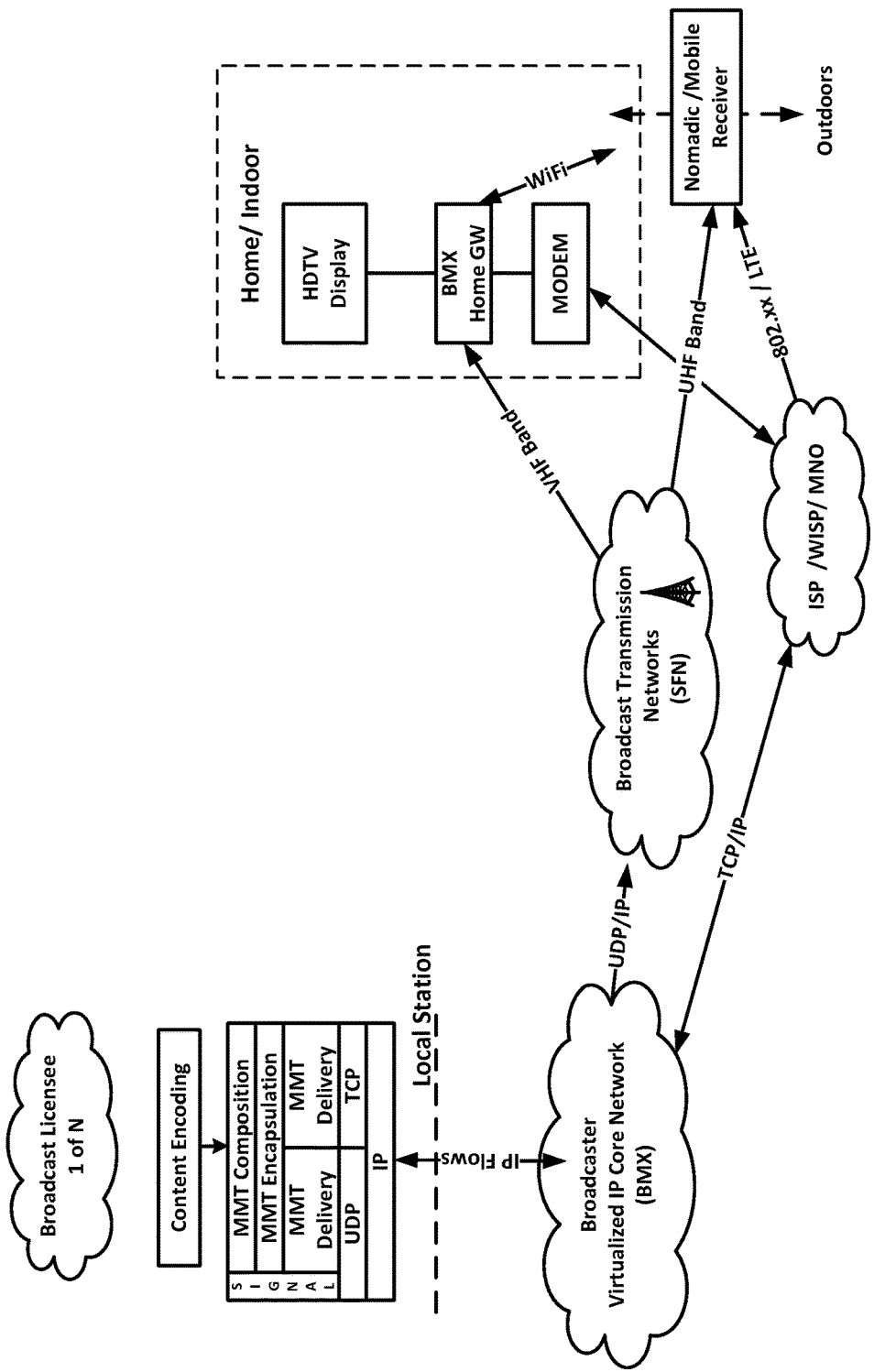
FIG. 1 is a conceptual diagram of a Next Generation Broadcast Platform (NGBP) in accordance with one aspect of the invention.

FIG. 1 illustrates a next generation ("Next Gen") broadcast platform ("NGBP") for terrestrial television broadcasting in the internet age according to a first aspect of the invention. The basic concept provides a common virtualized IP Core network for broadcasters in local market and or region. The IP Core network provides an interface to and accepts IP Flows from broadcast licensee/s. The IP Flows contain encoded media content composed and encapsulated using an application layer transport for example MPEG Media Transport (MMT) for delivery of video, audio and data content. The IP Core network contains an entity called a Broadcast Market Exchange ("BMX"). The BMX may be implemented as software running in a node of the IP Core network that enables broadcast licenses to have spectrum flexibility and market-based mechanisms to monetize (wholesale) excess spectrum capacity by entering into service level agreements (SLA) with other broadcasters or entities. Also, as the VHF/UHF broadcast band spectrum isn't fungible, with the VHF band having physics properties that are more commensurate to fixed service while the physics in UHF broadcast band can more efficiently support nomadic services. The BMX offers open market driven mechanisms to enable a broadcaster diversity or choice of the mix of service types (fixed/nomadic) independent of their FCC licensed frequency in either the (VHF/UHF) broadcast band using the services of the broadcast market exchange.

The outputs of IP Core Network are processed UDP/IP streams to a "broadcast" transmission network (VHF/UHF) band or TCP/IP streams to a "unicast" networks such as that of an Internet Service Provider (ISP), Wireless Internet Service Provider (WISP) or Mobile Network Operator (MNO). The broadcast network signal is received by both fixed and nomadic/mobile reception devices. The unicast network provides an IP connection to either the home and or nomadic/mobile devices in the heterogeneous network shown under the control of the intelligence (BMX) in the IP core network. Using BMX, a broadcaster may have the option of diversity of services types and also control of multiple simultaneous delivery channels and physical 'bearer' layers coordinated to increase the consumer experience for multimedia services in the internet age.

The Broadcast Market Exchange (BMX) is created to enable the sharing and or aggregation of broadcast spectrum, the bit capacity generated and/or broadcast transmission infrastructure (active and passive components) to reduce cost for broadcasters in a given geographic area, ranging from a local basis, regional basis (e.g., a Designated Market Area (DMA)) to a national basis. The Broadcast Market Exchange can be responsible for managing participating broadcasters pooled of spectrum resources in the most efficient and effective way in a wide variety of ways including terms of service, revenue, (e.g., people served/MHz, revenue/MHz) and Quality of Service (QOS). The aggregation of spectrum and capacity under a Broadcast Market Exchange is through the voluntary cooperation/agreement of the broadcasters. Some broadcasters may prefer to maintain the current broadcast model and or transition into new services as the market demands. Therefore, the broadcast/broadband convergence network envisioned is designed to support all existing business models as well as the new exchange business models that emerge in future.

Figure 2:
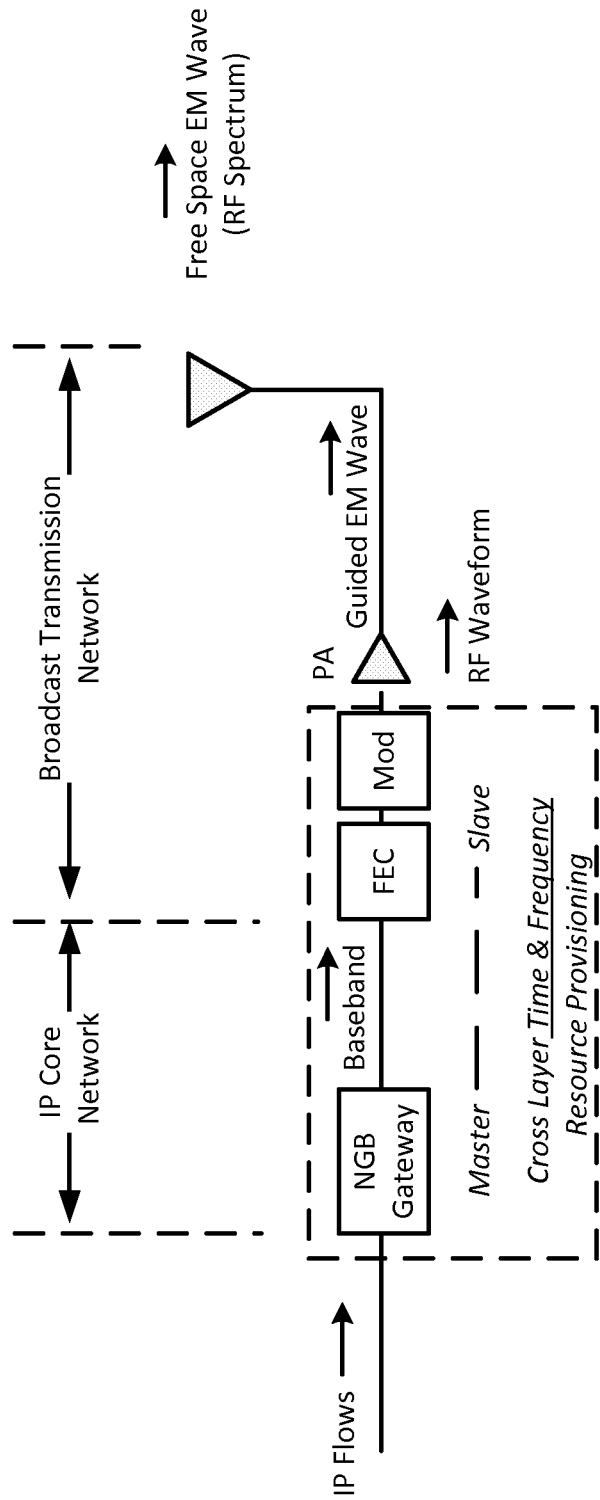
FIG. 2 is a block diagram of the NGBP according to one possible embodiment of the invention.

As shown in FIGS. 1 and 2, a broadcast licensee produces and or encodes content into IP Flows that are sent across an interface into the IP Core network where a Next Gen Broadcast (NGB) gateway under the managed control of BMX entity is located. The NGB gateway pre-processes the IP Flows and provides a baseband IP signal as output (UDP/IP) to a defined modulator interface in the broadcast transmission network. The baseband signal created in the NGB gateway also contains control plane signaling decoupled of the user data plane that enables the gateway as a master and the modulator(s) as slave/s (multiple modulators in a SFN) to construct a physical layer OFDM frame using the cross-layer control plane mechanism of the NGB gateway. The OFDM physical layer resources are provisioned and or assigned in the NGB gateway (located in IP Core miles away from modulator/s) as logical baseband frames and output as IP flows which map directly into reserved physical layer resources as termed virtual physical layer pipe (PLP) structures, each with flexibility in selection of Channel coding, Constellation and time Interleaving to enable a unique robustness and/or spectrum efficiency under the control of the broadcaster. These PLPs are then mapped onto OFDM sub-carriers reserved in the NGB frame. The signal is converted to a RF waveform that is amplified and carried as a guided wave to the air interface of the transmitting antenna.

The NGBP (IP Core Network) provides a unique Master/Slave (Cross Layer) relationship that puts the control of all physical layer resources into the NGB gateway generally located miles away from the NGB modulators (transmitter sites). At the Air Interface of the transmitting antenna the guided RF wave enters the broadcast spectrum (today 2013, broadcast channels 2-51 in the VHF and UHF bands). The broadcast spectrum is not fungible, as some parts of the UHF broadcast band are more efficient and practical for Nomadic Tablet/Handheld type service and others (VHF) for a fixed type of service.

Without a broadcast market exchange (BMX) mechanism as provided by the present invention, a broadcaster is mainly limited by physics and/or economics as to the type of services they are able to bring to market. Spectrum is most valuable if used for the type of services dictated by the RF physics in specific frequency bands. There is no one single part of the (VHF/UHF) broadcast band that supports all service types efficiently. The general idea in legacy broadcast standards usually has been that each broadcaster can provision both fixed and or nomadic services in the same band using either time or frequency division multiplexing schemes, etc. ("Nomadic service" is defined as adequate robustness and a Doppler performance and having a frequency (wavelength) that enables embedded antennas in a nomadic device using known active antenna techniques. The definition for fixed service is good spectrum efficiency and uses an external antenna. VHF can also be provisioned to serve mobile at high Doppler with external antennas on vehicles, buses, trains, etc.).

The conventional multiplexing of all service types in a single channel is a sub-optimal solution because it ignores the underlying RF physics which sets certain constraints which are real world engineering challenges that are usually difficult or impossible to overcome while preserving both spectrum efficiency and economics. The paradigm shift introduced by the BMX is that a broadcast licensee choosing to participate in the exchange is no longer constrained by physics buts enters an open market environment and spectrum use can be aligned with physics which reaps efficiency. In a nutshell this enables market driven use of scarce resource (spectrum) and diversity of service types for all participating broadcasters.

Figure 3:
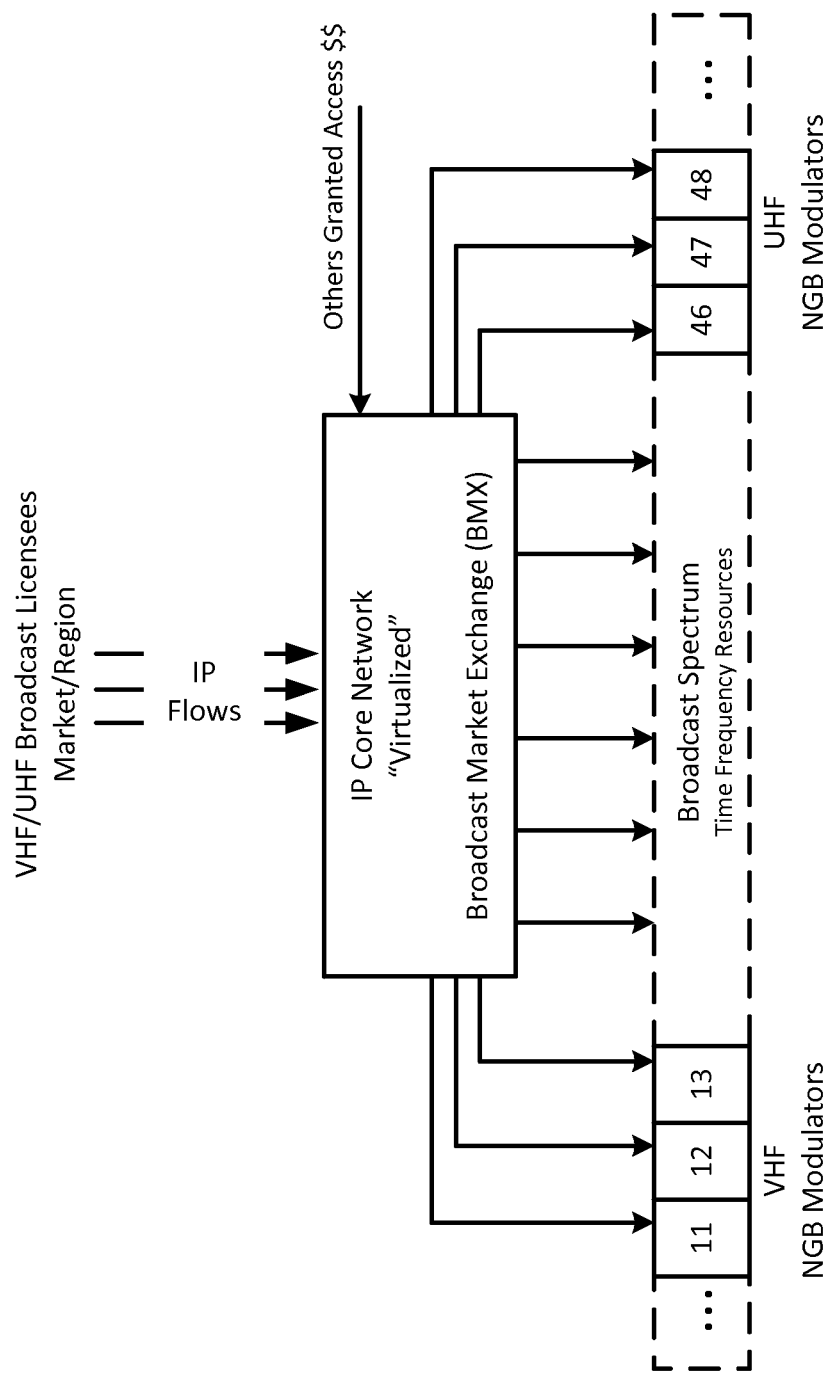
FIG. 3 is a Conceptual block diagram of the IP Core Network and Broadcast Market Exchange (BMX) concepts.

FIG. 3 shows a high level view of IP Core network and the BMX concept. The encoded content IP flows from broadcast (i.e. VHF/UHF) licensees enter the IP Core network, which has one or more NGB gateways controlling all resources (e.g. either VHF NGB modulators or UHF NGB modulators). After making management decisions the IP Core network (BMX) dynamically handles all signaling needed for discovery of content in the emitted waveform which will be received, decoded and content presented natively as HTML5 elements of a web browser under total broadcaster control.

The BMX entity is implemented as software running in the IP Core network that defines the framework of the environment to give participating broadcasters an options for choice in service type via an open process with pre-defined rules and procedures and with open verification mechanisms and back office interfaces for commerce (similar to 3GPP LTE EPC today). The BMX can be a dynamic process and spectrum assets can be traded or wholesale service level agreements (SLA) established among broadcasters or other entities, now or in the future (scheduled). This functionality is well within the scope of known technology today as will be explained further hereinafter. The model of an IP Core network is at the center of new broadband communications system architectures such as 3GPP LTE EPC (Evolved Packet Core) and it will help in harmonizing the NGBP to the web and also contains intelligence "data" on the viewing audience for new business models normally outside the reach of broadcasters. With the rapid pace of technology today the BMX paradigm may also give some relief or a new tool to regulators (FCC) charged to manage technological change while ensuring competitive and efficient use of spectrum and serving the public interest. BMX can react instantly and be openly verified were a regulatory rule making can take years and may then be sub-optimal when implemented because technology has advanced again.

Figure 4:
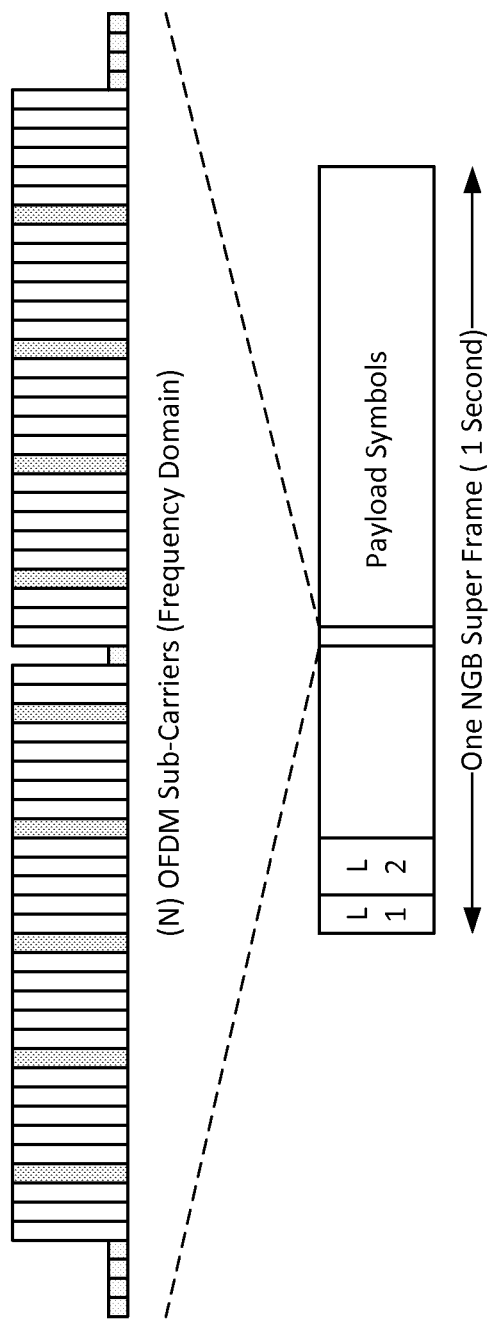
FIG. 4 is a diagram showing OFDM physical layer time and frequency resources in a broadcast.

A more detailed look at some of the pertinent Physical layer resources that will be brought under control of BMX for provisioning is now presented. In FIG. 4, an OFDM (orthogonal frequency-division multiplexing) symbol in the frequency domain is shown, composed of (N) sub-carriers across some defined bandwidth (e.g., 6 MHz, 12 MHz, etc.). Some sub-carriers are not used on the channel edges or center channel (DC) these are shown at zero power. Some of the sub-carriers will be used as pilots to aide receiver synchronization and or channel estimation or other purposes, and these are shown as full power but greyed and are consider provisioning overhead. All the remaining sub-carriers that can be provisioned to carry useful payload data from the IP Flows mapped in the form of PLP. It should be understood all provisioning of physical layer resources happens in the NGB gateway (under BMX control) using the control plane to Modulator (slave) as previously mentioned. In the time domain as shown FIG. 4 is there is a NGB super frame that is exactly one second in duration. In the time domain the design or selection of the correct symbol sampling frequency is critical for the NGBP OFDM system to insure an integer number of OFDM symbols per super frame. The design of BMX requires an integer number of symbols per frame to make the provisioning of the shared OFDM resources more deterministic and manageable, than would result by having some fractional number of symbols per frame relationship and in time domain. Also, as will be seen later the super frame structure is aligned with a UTC seconds timeline which is available to all users accessing the IP Core to affect efficient timing of the IP Core network. FIG. 5 shows a table with an example of the OFDM parameters suitable to BMX this requirement. The design requires a constant symbol sampling frequency, shown as 12.288 MHz in FIG. 5 which is constant over all supported bandwidths (5, 6, 10, and 12) MHz shown for example. The FFT sizes and cyclic prefix (CP) chosen as shown for examples in FIG. 5 result in an integer number of symbols per frame and an integer number of symbols per one second super frame. Having an integer relationship is also critical to support the NGBP Application Layer Transport timing by enabling the establishment of a UTC clock in the broadcast receiver client to be discussed later. One NGB Super Frame is composed of (N) payload symbols and L1 and L2 symbols used for signaling, the total duration of all of these symbols must be summed to enable a NGB super frame one second in duration. All pilots and signaling (L1/L2) are considered overhead in the provisioning of a service. The number of payload symbols in time domain is directly proportional to the value of the cyclic prefix chosen which is used to mitigate multipath in OFDM systems. Each payload sub-carrier is a resource element that can support a given robustness described by the constellation size chosen, say 16 QAM and a FEC code rate say 3/5 FEC as only one example. It is a straightforward calculation in NGB gateway to determine how many payload sub-carrier resource elements (sub-carriers) are needed to support a given IP Flow (PLP) at a given input data rate for a given robustness, etc. when dealing in integers.

The total number of useful payload sub-carriers assigned to various BMX users to provide a type of service (nomadic/fixed) is virtualized and all BMX users remain totally isolated, competitive and independent while sharing spectrum resources more efficiently. Each broadcast licensee would have total freedom in selecting the PLP parameters' "robustness" for their nomadic and or fixed services. They may use up to their total allotment of useful "global" payload subcarriers (across VHF/UHF) band which is directly proportional to the amount of spectrum the licensee has contributed to the BMX broadcast spectrum pool (minus overhead to provision which is shared by all) and credits purchased and or traded in the exchange, the BMX keeps track of this commerce in real-time, and spectrum becomes a commodity.

For one example, a broadcaster's business model could include fixed services to the home at certain times of the day or even for a special event in UHDTV. As an example the special event could be scheduled and credits could be established with BMX or other market based mechanisms used to ensure this event capacity is scheduled and available. This type of flexibility was never envisioned when broadcast spectrum rules were first promulgated so modernizing of the FCC command and control rules and regulations will be required and must be including in new flexible spectrum use negotiated by broadcasters for the internet age.

Figure 6:
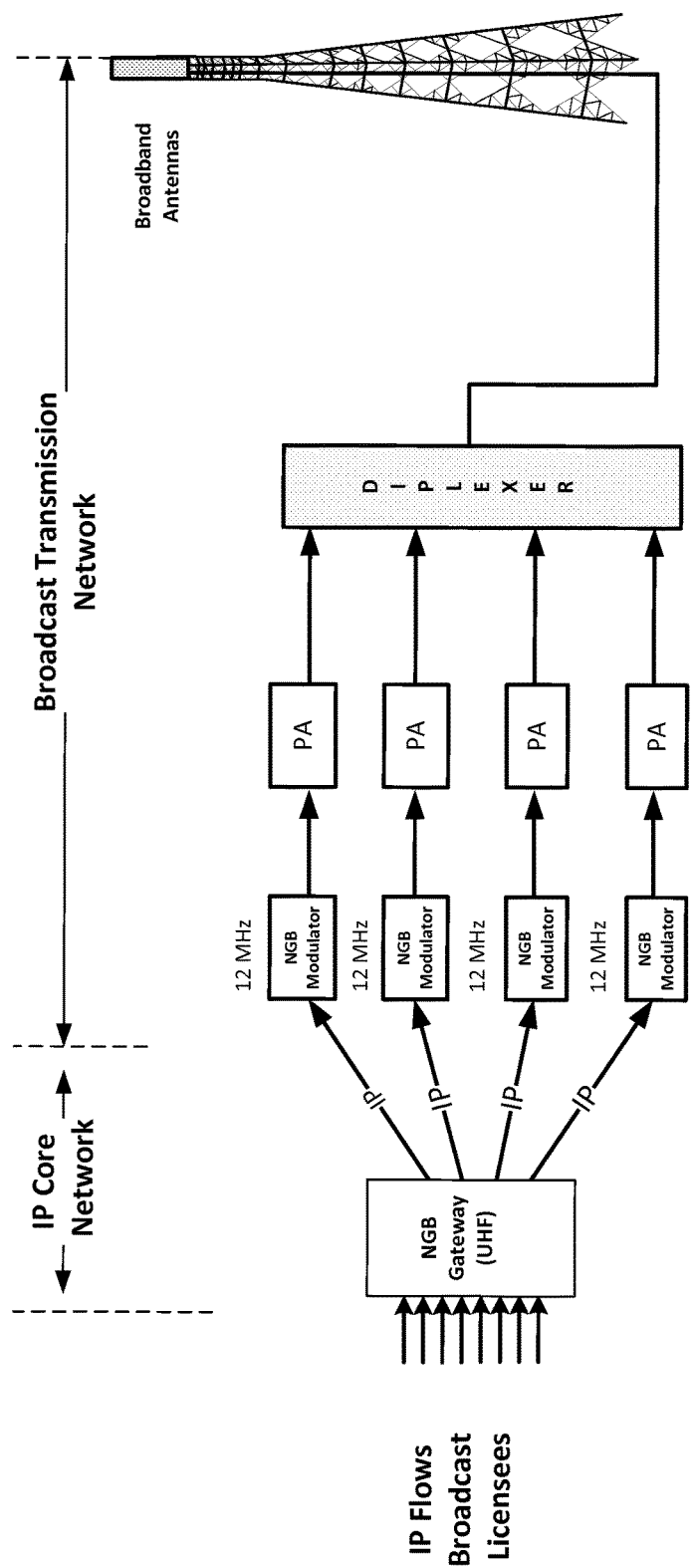
FIG. 6 is a block diagram of UHF Band spectrum sharing aggregation under control of BMX in accordance with an aspect of the invention.

FIG. 6 shows one example of the shared broadcast transmission network for UHF spectrum aggregation under control of BMX. There are four 12 MHz NGB modulators under the control of a single UHF NGB gateway under control of BMX entity in the IP Core Network. The 12 MHz bandwidth blocks could be either contiguous or separated UHF spectrum blocks. As shown, active and passive transmission components are co-located and shared. This sharing of both active/passive components could bring real economic savings in capital and operational expenditures. The sharing of the broadband antennas at a common emission point would enable a "receive one-receive all" reception model and this is very consumer friendly. The 48 MHz of shared spectrum resources shown of this one UHF site could conservatively support an aggregated 100 Mbps of payload for broadcast nomadic services in a market.

Figure 7:
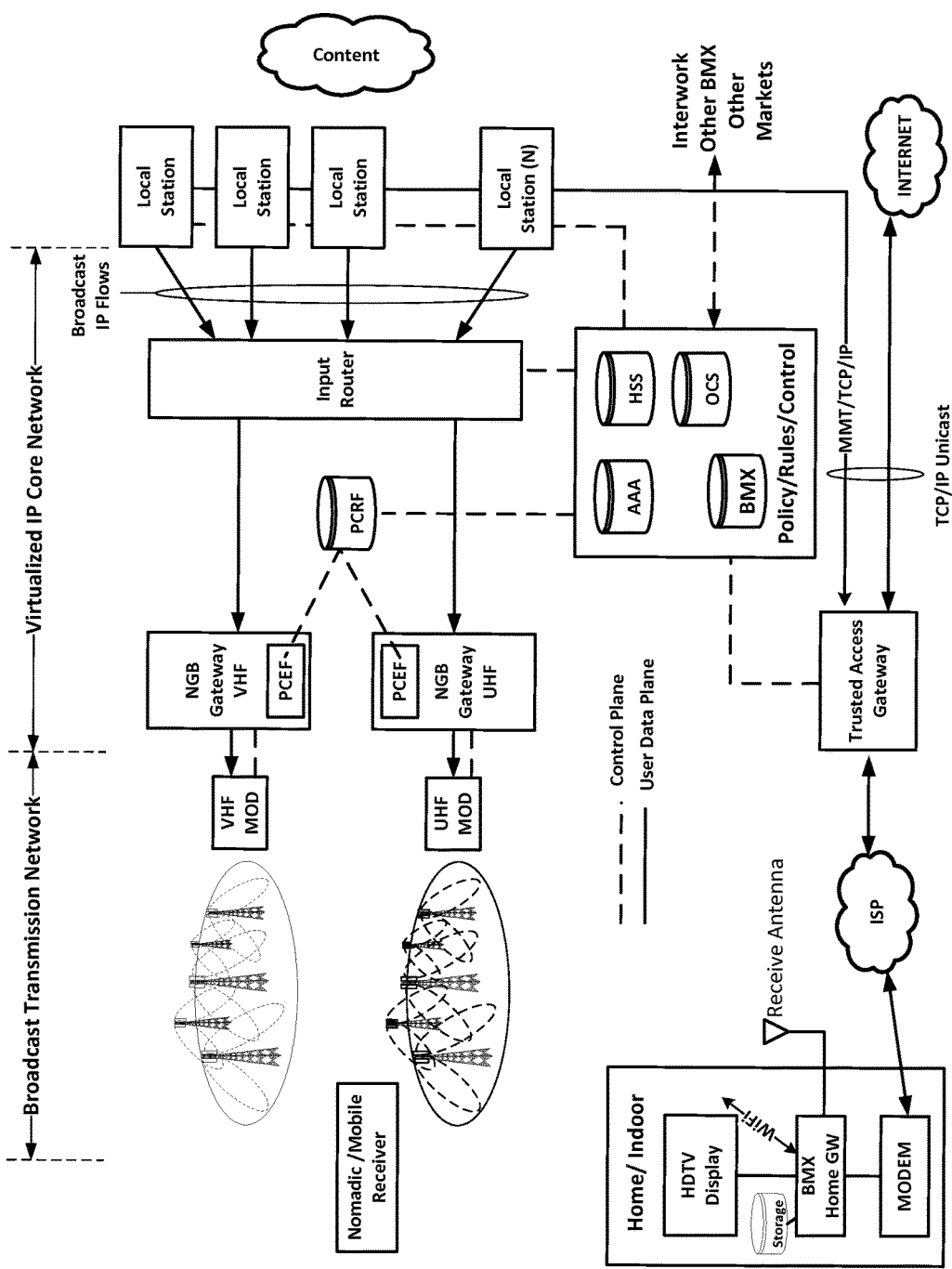
FIG. 7 is a diagram that illustrates the major NGBP IP Core Network entities to support broadcast and unicast services under BMX and IP Core.
Figure 8:
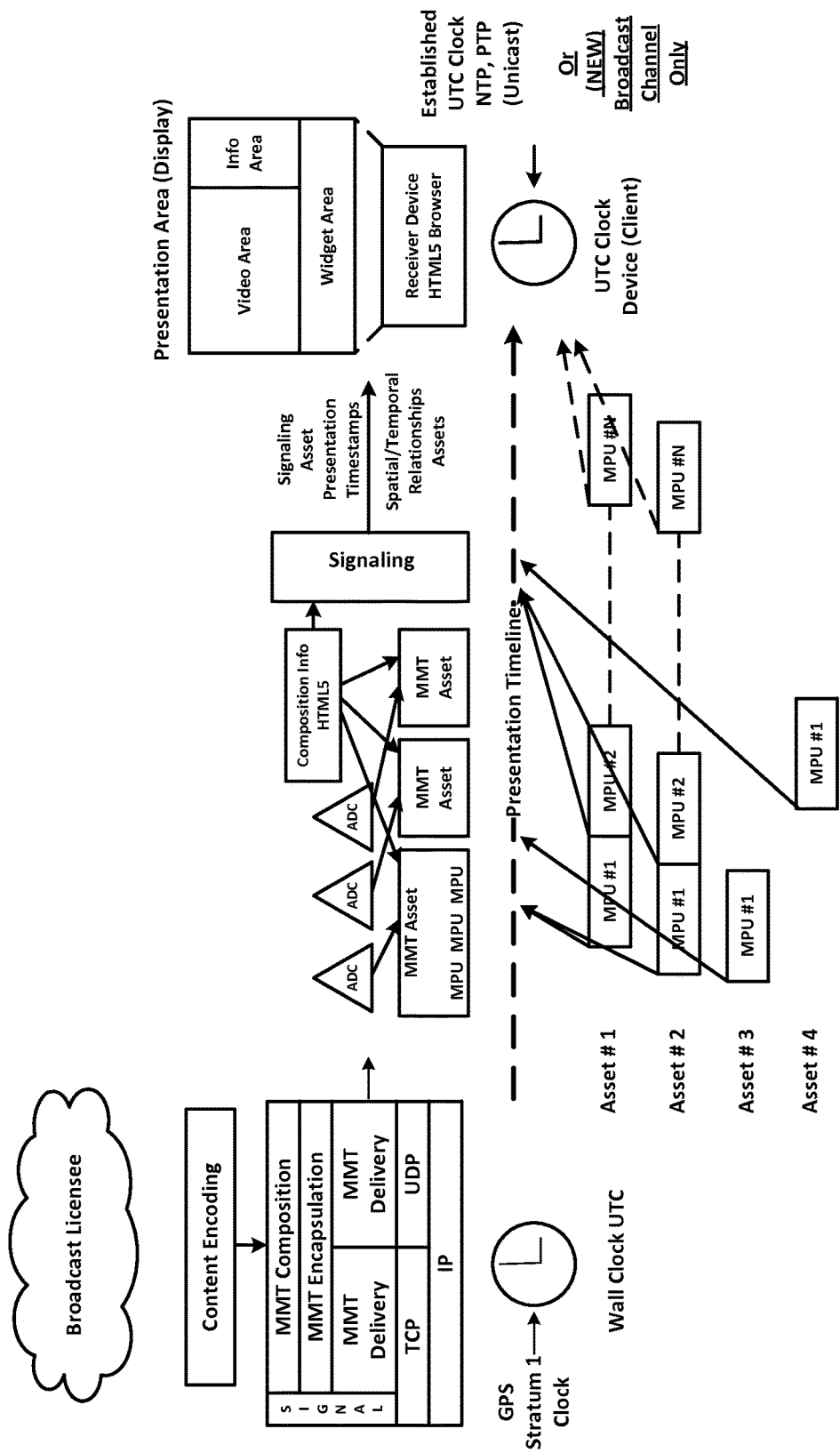
FIG. 8 is a diagram showing an example of the NGBP application layer transport protocol layers to provide heterogeneous network services.

FIG. 7 illustrates the NGBP and the IP Core Network entities in more detail that is needed to support broadcast/unicast services in accordance with the invention. These are as follows:

Input IP Router—under control of BMX entity routes MMT IP Flows to a NGB GW that is dependent on service type and enables dynamic market driven spectrum sharing;

NGB-GW—NGB gateway receives control from BMX and pre-processes the IP Flows and provides a baseband IP signal output to a defined modulator interface in the broadcast transmission network. The baseband signal created in the NGB gateway also contains control plane signaling that enables the gateway as a master and the modulator(s) as slave/s to construct a physical layer OFDM frame using the cross-layer control mechanism of the NGB gateway. The bandwidth under NGB GW to be provisioned is assigned by BMX;

PCRF—Policy Charging Rules Function is a node designated in real-time to determine policy rules under control of BMX it operates at the network core and accesses subscriber databases (HSS) and other specialized functions, such as the online charging system (OCS), in a centralized manner in IP Core;

PCEF—embedded in NGB-GW performs (Policy Charging Enforcement Function) identifies all IP Flows based on real-time Deep Packet Inspection (MMT Asset ID, etc. unique to each user). Helps to monetize network by supporting OCS and ensures open fair usage of shared spectrum and enables confidence and trust in the Broadcast Market Exchange. A broadcast licensee (user) can see in Real-time (via dash board) quantity of sub-carriers being used and robustness (QOS). All of the broadcaster account information is available from the broadcast market exchange via an interface on a secure dash board;

BMX—Broadcaster Market Exchange is the master entity in charge and contains agreed policy rules and service level agreements (SLAs) and grants users access over well-defined interface. The BMX communicates (schedules IP Flows) with Traffic and Automation system at local station or play out center participating in BMX;

HSS—Home Subscriber Server is main database of users of NGBP a repository of user data, and content consumed/watched (ratings), premium services subscribed to, etc;

AAA—Authentication Authorization Accounting is a database to enable registered NGBP user's access over any IP Unicast access Network 802.xx, etc.;

OCS—On-Line Charging System, tracks Service level Agreements and usage and charges and Interfaces to Back Office for commerce;

Interworking Interface—to interwork with other BMX entities in other IP Core networks in other markets or regions in country. Each receiver device contains a SIM card and when device purchased the user registers the device with the home BMX and the user personal data is stored in HSS. When a user roams outside home BMX market (get off airplane with a nomadic device) the interworking in addition to data stored on SIM ensures continuity of service and enforcement of any geographic content right agreements from content producers, etc.;

Trusted Access Gateway (TAG)—the TAG is used to grant access to authorized users over TCP/IP unicast connections. The TAG uses the AAA that authenticates and authorizes user access from external IP networks (Internet) or unicast MMT/TCP/IP;

Home Gateway with Storage—A data modem and ISP provides OTT (Over The Top) TCP/IP connectivity to the Home Gateway, the BMX/Broadcaster manages the BMX Home Gateway (has SIM card) and can be to establish as anchor point in the home for personalization of services and side loading content and advertising. The BMX home gateway has Wi-Fi and can synchronize content on a nomadic receiver when entering home that is registered in BMX and has a binding with home gateway. The BMX Home Gateway has an antenna and a NGB broadcast receiver and can receive broadcast and unicast services in heterogeneous network;

FIG. 8 shows a model the application layer transport that is being standardized in MPEG as ISO/IEC 23008 Part 1; MPEG Media Transport (MMT) which is due to be completed in 2014. MMT is a new media transport being developed to support Server driven broadcast (Push) services and unicast (Pull) services of both timed and untimed multimedia content over heterogeneous networks including broadcast and unicast networks. MMT supports W3C HTML5 w/extensions for presentation description on a client device having a HTML5 web browser without using plugins for Video/Audio. This could enable more ubiquitous access in next generation broadcasting and enable support of many new W3C web tools to become more aligned with broadcast and keep pace with other media in the internet age. On the client display the spatial and temporal relationships of all timed MMT Assets (Video, Audio, and Data) are described by the MMT Composition Information (CI) signaling (HTML5 extensions) and an by the Asset presentation time stamps that are referenced to a presentation time line (UTC) to enable synchronized choreographed playback of all MMT assets on a client device at the presentation time (indicated by time stamp) by a web browser engine even when the assets are delivered to the client over different networks, or delivered in advanced and stored locally on client, etc. Also, each spatial/temporal asset area on the display (Video, Audio, or Data) can be independently updated and decoupled from the other media assets of the broadcaster choreographed presentation and may be delivered by independent channels that all referenced a common UTC presentation time line to create a new web like paradigm for the NGBP and enable convergence of broadcast and broadband in the internet age with many new business models, some of which will be discussed later.

In the MMT standard the presentation time line is shown in FIG. 8. The presentation timeline is based on the assumption that a common UTC clock reference is available at both the sending and receiving (client) side of the delivery channel. The MMT standard states that the clock of the MMT entities shall synchronize with the UTC by some means. For example, by NTP or PTP, as specified in RFC 5905 and IEEE 1588 respectively may be used. This UTC clock requirement means that a unicast connection must be available at the MMT client to use either NTP or PTP method. This is very troubling in that a broadcast channel is supported in MMT but only in the presence of a unicast channel to establish a UTC clock reference in the client. This can serious constrain the next gen broadcast nomadic client device from using MMT unless it has some form of IP unicast connection, etc. FIG. 8 shows that a UTC clock can be established in the client using unicast (NTP, PTP) according to MMT standard, or a New broadcast channel method can be used to enable truly broadcast only operation under MMT by establishing a UTC clock in broadcast client over the broadcast channel only. This is part of the present invention and will be described next. It should be understood that this method to be described of establishing an accurate UTC clock in the broadcast client can be used to solve the problem or constraint in MMT to enable broadcast only operation but should be also useful for many other applications requiring UTC time to be served over a broadcast channel to a receiving client.

Figure 9:
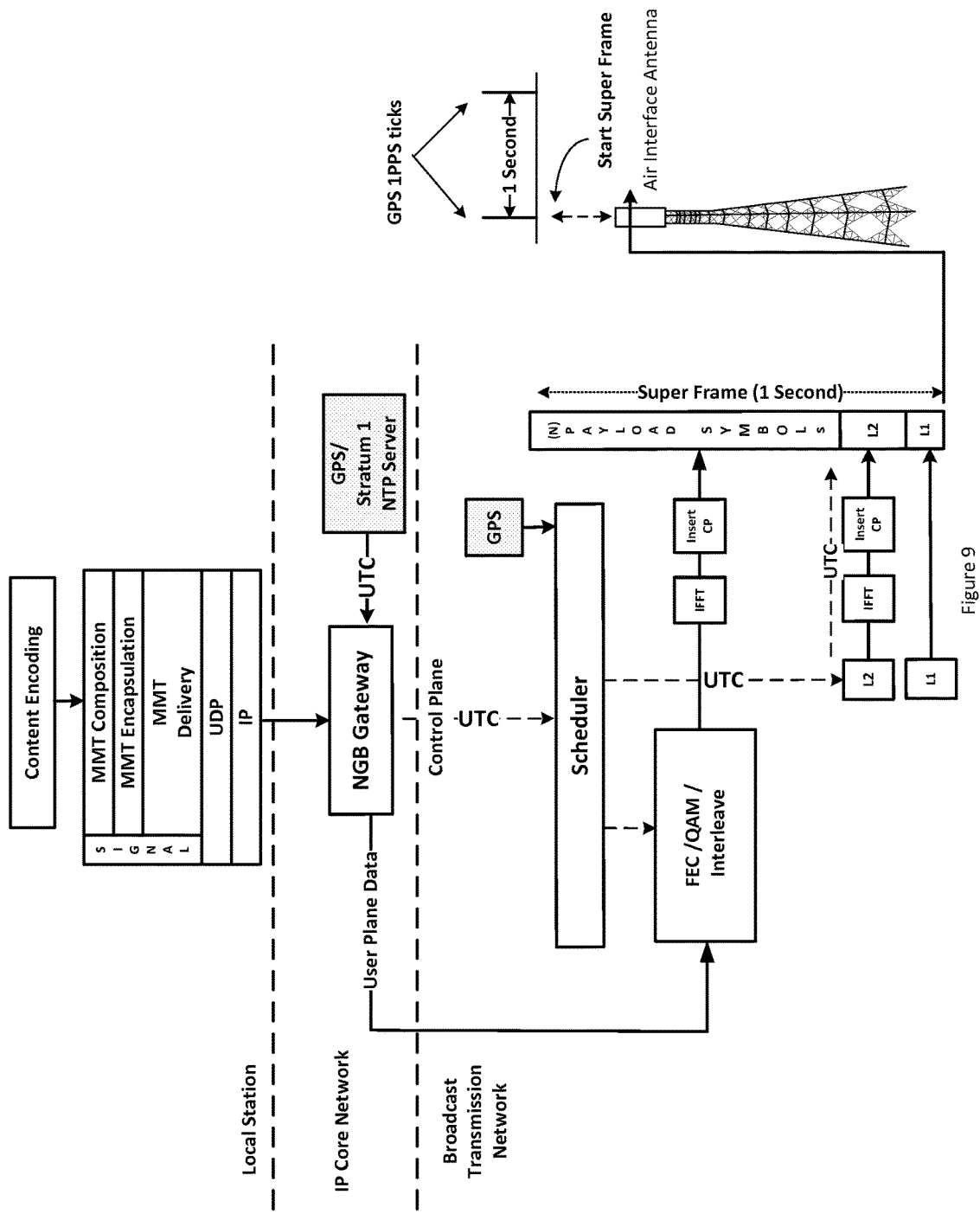
FIG. 9 is a block diagram showing the transmission side of a new method for serving or establishing UTC time clock in the receiver client using only the broadcast channel.

FIG. 9 shows the block diagram to be used to describe the transmission side of the new method for serving UTC time over the broadcast channel. The NGB OFDM super frame structure is shown and begins with L1, L2 signaling symbols followed by (N) payload symbols and the super frame is set to exactly 1 second in duration. The scheduler (part of NGB Modulator) has a GPS receiver and has a 1PPS (One Pulse Per Second) timing reference available that is by definition also aligned to the UTC second cadence. The scheduler then adjusts or controls the emission timing so that the start of a super frame (L1) at the air interface of the transmitting antenna is aligned with the GPS 1PPS rising edge of pulse as shown. Once this timing is set every super frame (exactly one second in duration) has the beginning of the (L1) symbol aligned to the GPS 1PPS cadence. Next in the IP Core network the NGB gateway is synchronized to UTC time by a Stratum 1 NTP server as shown or by other equivalent mechanisms. The NGB gateway sends the modulator scheduler the current UTC time information correlated with beginning of current super frame that the scheduler is being instructed to build over the control plane as shown. The scheduler then inserts current UTC time information as part of the L2 signaling information and this is carried in L2 symbol portion of a super frame as shown. So the start of super frame (L1) is time aligned with the GPS 1PPS cadence at the transmitting antenna air interface and the (L2) symbol carries the UTC time at start of current super frame (beginning of L1). The physical layer emission timing is locked to GPS 1PPS which by definition is aligned with the UTC second cadence. The GPS timing has the attribute of no leap seconds and is appropriate for stable physical layer timing synchronization in the broadcast transmission network.

Figure 10:
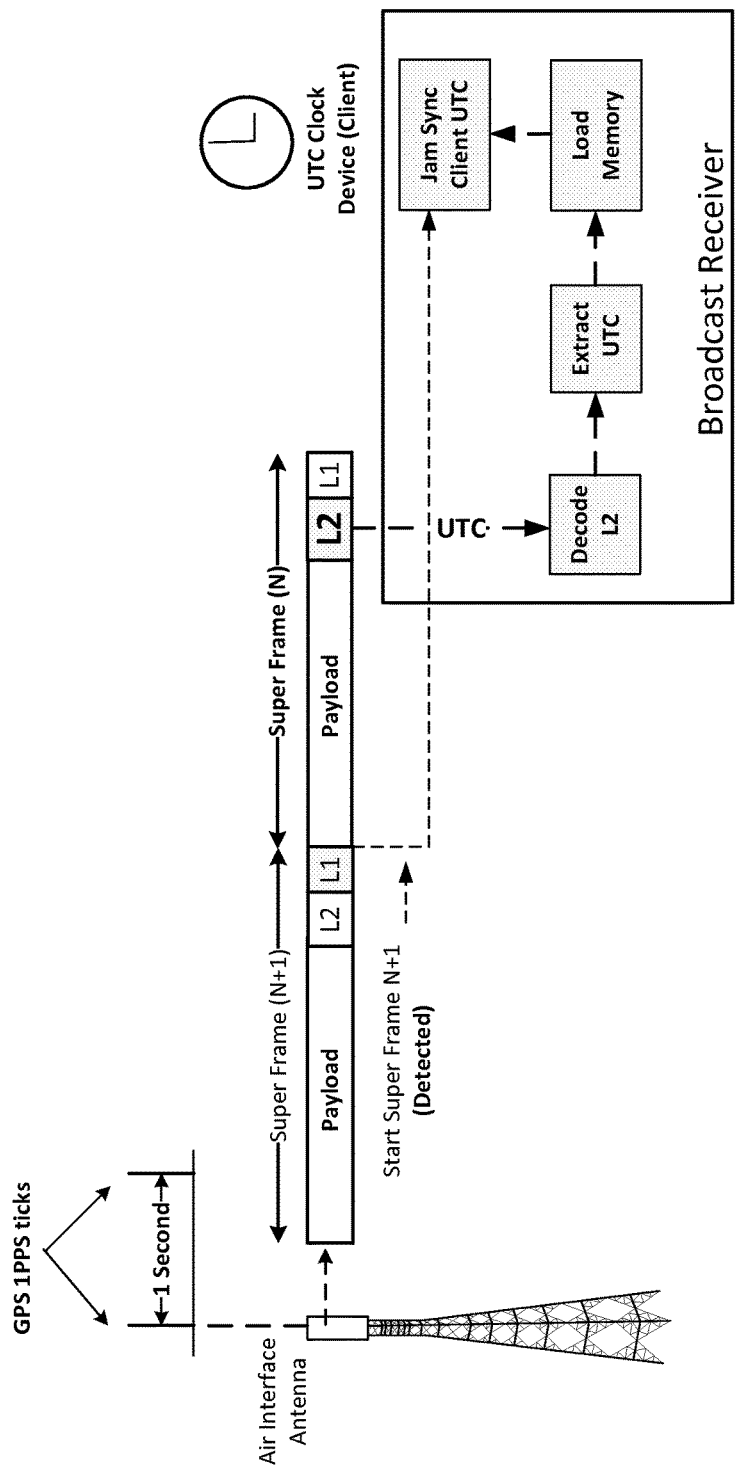
FIG. 10 is a block diagram showing the client side aspects of establishing UTC time clock at the receiver client over only the broadcast channel.

FIG. 10 shows the client side for establishing UTC time at the client. There is shown two super frames (N) and (N+1) in flight to the NGB broadcast receiver from the transmitting antenna. The client can establish a UTC clock by slaving to the emitted broadcast signal as discussed below. It is assumed the client is initially asynchronous to UTC and detects super frame (N) shown and the UTC time information (L2) is decoded and extracted and the UTC second count is incremented by 1 second and then stored in memory shown. The receiver then waits for the next start of a super frame (N+1), when this L1 symbol is detected at that exact instant the UTC time is jam loaded from memory into the client UTC clock counter. The correct accurate UTC time is then available at the client. Since, a radio wave propagates ~1 mile in 5 µs, a broadcast client located 20 miles from the transmitter only has an error of 100 µs and is well within the tolerance needed. In fact this is orders of magnitude more accurate than can be achieved from NTP on the public internet. Once, synchronized the client remains slaved to broadcast signal and can resynchronize quickly if needed. This means if a nomadic broadcast client is away from a unicast connection or is powered up on a plane that just landed in a different BMX city the UTC clock would be quickly set in that time zone, etc. depending on user data stored in SIM as mentioned earlier (gives users rights in that BMX market) multimedia presentations can begin immediately under BMX control and this is very consumer friendly. This method doesn't prohibit using other sources of UTC time for MMT such as NTP when deep indoors and broadcast signal is unavailable and then MMT content could be served over unicast, Wi-Fi, etc. by the IP core network of broadcaster BMX. The high power transmitted signal that covers a large area using very robustly coded L1, L2 signaling will be more robust than the content broadcast making the application of broadcast UTC time attractive for many other possible applications. It is also envisioned that GPS receivers with rubidium holdover could be used for timing on the IP Core and broadcast network. The cost of this technology is minimal today and would more importantly keep the broadcast network as a life line to the public and to others if the GPS was jammed in a city someday as part of a terroristic event, not unthinkable in the world we live in today.

Figure 11:
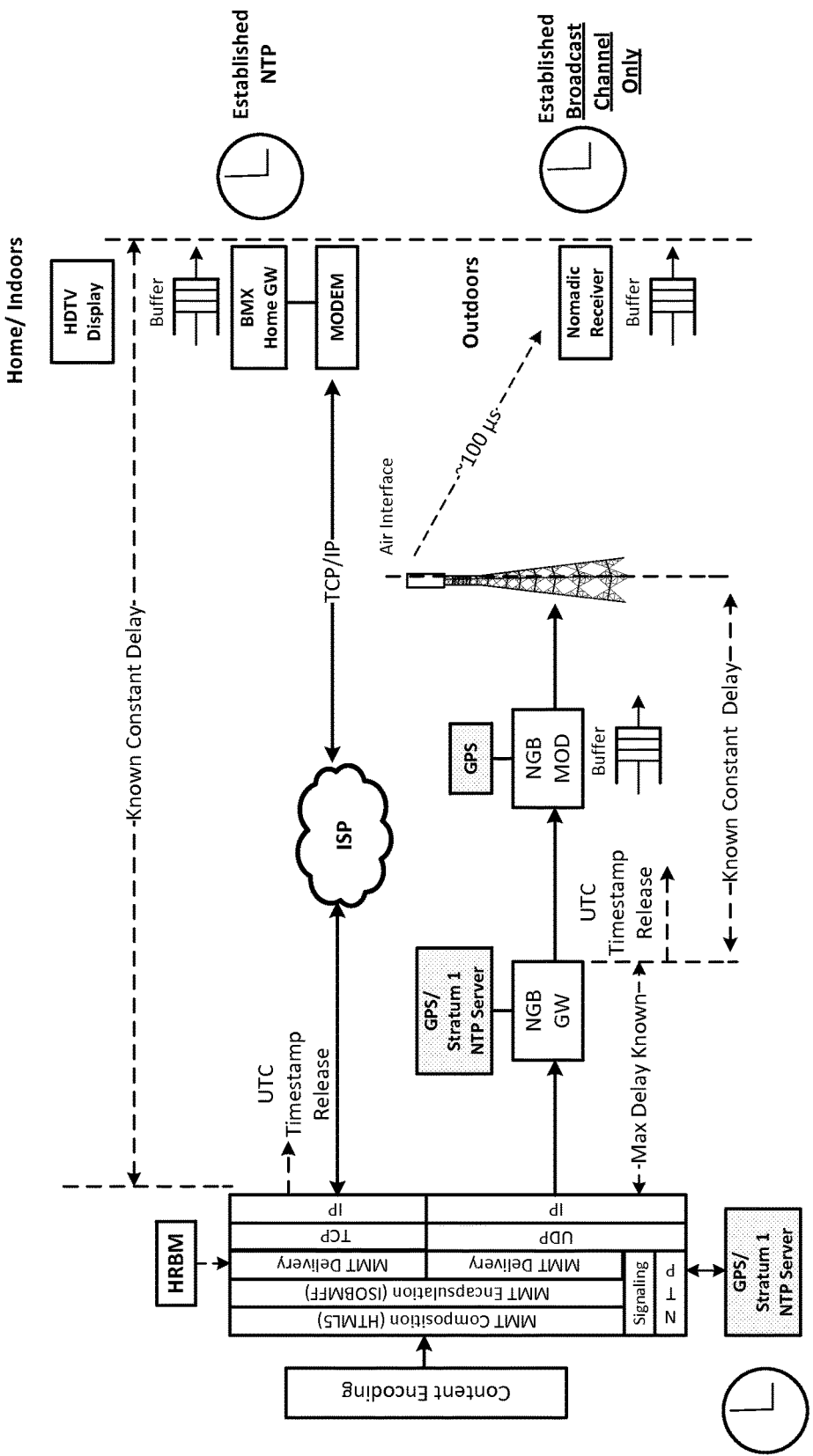
FIG. 11 is a block diagram to help illustrate the NGBP application layer transport timing mechanisms in a heterogeneous network.

FIG. 11 shows a block diagram to help explain the NGBP application layer transport timing in a heterogeneous network that is comprised of broadcast and unicast delivered content once a reliable UTC clock reference is established at both server and client side to enable a common presentation timeline to which time stamps will be correlated. The application layer timing in the heterogeneous networks can be adjusted for various purposes including establishing an offset time to enable receive diversity, etc. But, for now to introduce the timing concept it is assumed we want to achieve synchronous presentation of the exact same media content broadcast MMT/UDP/IP over the air to a nomadic device and unicast MMT/TCP/IP via an ISP to a BMX home gateway with attached display shown. That is the Video/Audio of the exact same content is presented synchronously on both client devices. First the unicast MMT/TCP/IP channel via an ISP will be discussed. Since, this is local broadcasting an ISP within the coverage area would be used. The MMT standard describes a Hypothetical Receiver Buffer Model (HRBM) that is modeled at the MMT sending entity (shown) to determine the buffer size and the buffering delay.DELTA., so that no packets are dropped due to buffer overflow, assuming a maximum delivery delay in the target path. The maximum delivery delay needs to be larger than the actual delivery delay and can be estimated by in HRBM by pinging, etc. Once, max delay and a buffer is established at server and signaled to client. A UTC timestamp with the actual release time (UTC) of packet is sent from server (shown) to client. The client observes UTC time it received the timestamp (Client UTC Clock) and subtracts the value of timestamp sent from server indicated in the packet to get the actual transport delay time. This is used to manage the buffer at client and to ensure a constant end to end delay is established which is known at the server side. At the MMT sending entity (HRBM) guarantees that packets that experience a transmission delay below a set threshold (max delay) will be delivered to the upper layer after a constant delay and without causing the MMT receiving entity buffer to underflow or overflow. In FIG. 11 it is shown the server side has a UTC clock established and by knowing the max delay time established in the unicast transport the server side can back time the release of content (assets) into unicast transport channel to ensure they are in the receiver (client) buffer and are removed and displayed at the instant indicated by the presentation time stamps inserted by the MMT application layer transport. Now the broadcast channel application layer transport timing will be discussed. The NGB gateway must first estimate the max transport delay between when a packet leaves the NGB gateway to the arrival at the air interface of transmitter antenna, this is done when the network is provisioned and these various component delays can be measured, calculated and or estimated using known techniques similar to those employed in establishing the value of max delay and timing in provisioning of a broadcast single frequency network (SFN) and will not be discussed. This total max delay estimate must be longer than the actual delay and can be measured, calculated and or estimated as previously stated. This method result is somewhat similar to HRBM method (unicast) except that pinging to determine delay isn't possible, in broadcast it must be calculated and then a margin included for any wander and or jitter in the total transport network expected. Note this could include a satellite transport path to the transmitter site. The NGB gateway would have a max processing delay time known and this is announced to the MMT server side by NGB gateway. The NGB GW max processing delay is then added to the Max Delay value measured, calculated and or estimated to guarantee that a packet can then be backed timed in the MMT server side. A packet then must be release to the NGB GW for processing before the actual presentation time (UTC) indicated by MMT asset time stamp minus (NGB Max Processing Delay+Max Delay measured, calculated and or estimated to air interface antenna). Given this timing constraint the broadcast client will set a buffer size and manage buffer and will pass MMT assets up the stack to the be displayed at the UTC presentation time indicated by MMT presentation time stamps carried in the application layer transport. The display of common content in FIG. 11 sent using unicast and broadcast channels given the timing methodology mentioned will be synchronously presented by a common UTC presentation time line established using unicast and or broadcast methods. It should be realized a Cable MSO in their role of broadband service provider (ISP) could transport NGB IP packets as just another heterogeneous network in the design. The NGBP heterogeneous network will give more choice for the consumer in an open market.

Figure 12:
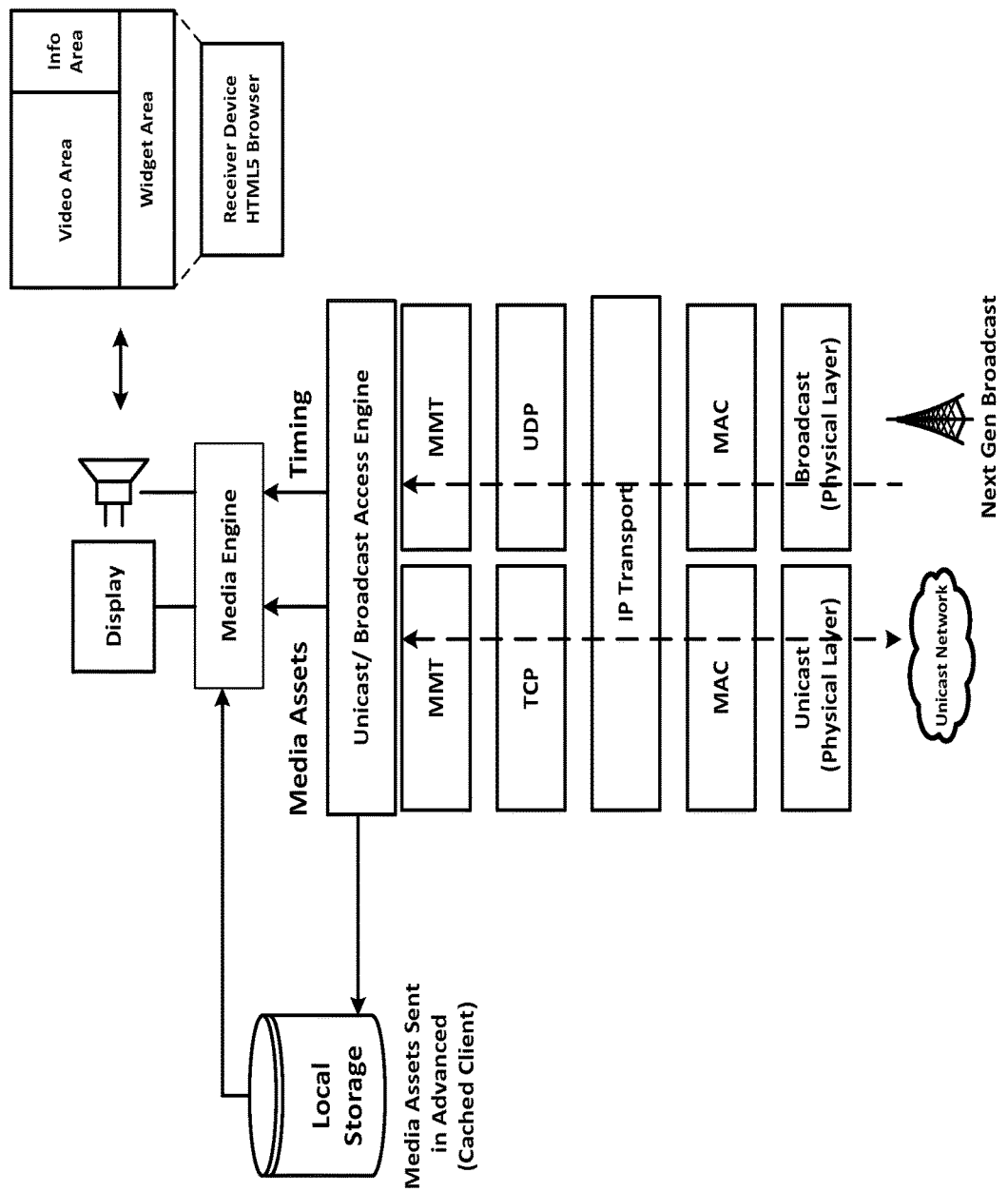
FIG. 12 is a block diagram of a client protocol stack of a hybrid (Broadcast/Unicast) capable receiver to aid understanding of potential use cases.

FIG. 12 shows a high level block diagram of a possible receiver client protocol stack envisioned for next gen broadcasting in the internet age. This is discussed briefly to aid the understanding of potential use cases to be presented. FIG. 12 is the client side view of a heterogeneous network comprising both Broadcast and Unicast channels and also non-timed media assets sent in advance and (Cached) and then removed from cache and decoded and all assets synchronously choreographed for presentation on a display by a HTML5 web browser engine. The client device uses methods to establish a UTC clock discussed earlier and can receive either the broadcast or unicast channels independently or both collectively including media assets received and stored in local client cache to enhance or personalize the presentation for the individual user with intelligence (user data) stored in the IP Core network discussed. In fact the media assets that comprise a multimedia presentation (TV program) can be choreographed under broadcaster control and media assets pulled from web servers, pushed (live) using broadcast and even blended with stored local content to create a synchronous rich presentation on the UTC presentation timeline. The reserved spatial/temporal media asset areas of the display can be updated independently over various channels and this web type functionality is a paradigm shift from current broadcast technology and production methods were all media is brought together in one location (local TV station) and combined (multiplexed) into a totally sealed cohesive TV package that is broadcast and instantly consumed or stored on DVR for later consumption. The media assets a user receives (under broadcaster control) could be specific to language, location, income, personal interest, etc. and be different than other users though the main video content area of display can be the same. Starting with the broadcast physical/mac layer and stack IP/UDP/MMT media assets can be delivered up along with signaling and timing information to ensure timed media presentation and or non-timed media assets can be cached for later presentation on UTC timeline using metadata (signaling) of asset ID in broadcast stream to trigger presentation of stored assets. The unicast channel works essentially the same way with IP/TCP/MMT as the stack to deliver up media assets signaling and timing for timed media or non-timed media can be cached. The multimedia assets and or data delivered in advance and cached can be consider an Augmentation channel to support and or enhance the main presentation (program) and this could include targeting ads even programmatic ads (sold to highest bidder in real-time) for the synchronous insertion in the UTC presentation timeline (commercial break), personalized news and entertainment, etc. appearing in a designated spatial/temporal area of the display screen under control of user interaction enabled by broadcaster or the entity providing content or advertising or leasing the channel during some time period. This new TV paradigm and web tools needs to be understood and embraced by the TV creative community to understand its true potential and to evolve broadcasting in the internet age. But, those familiar with W3C web tools should grasp these concepts easy. This opens more degrees of freedom to explore new use cases for NGBP and augmentation channels as will be discussed next.

Also, it should be noted that the MPEG standard ISO/IEC 23008 Part 1; MPEG Media Transport (MMT) which is due to be completed in 2014 will be harmonize by extension to support broadcast/multicast delivery of MPEG-DASH standard ISO/IEC 23009 segments without using HTTP by introducing the MMT "Generic Mode" object. This will create even more synergy between broadcast and DASH online streaming media and the possibilities of a NGBP, but this will not be discussed herein. Also note-worthy is the work just starting in IEEE in 2014 on a project called Omni-Ran that will provide well defined interfaces and the opportunity to enabled managed unicast support by the IP Core (BMX) on 802.xx access networks and this is envisioned to be very synergistic as well to NGBP and IP Core network but will not be discussed herein.

Figure 13:
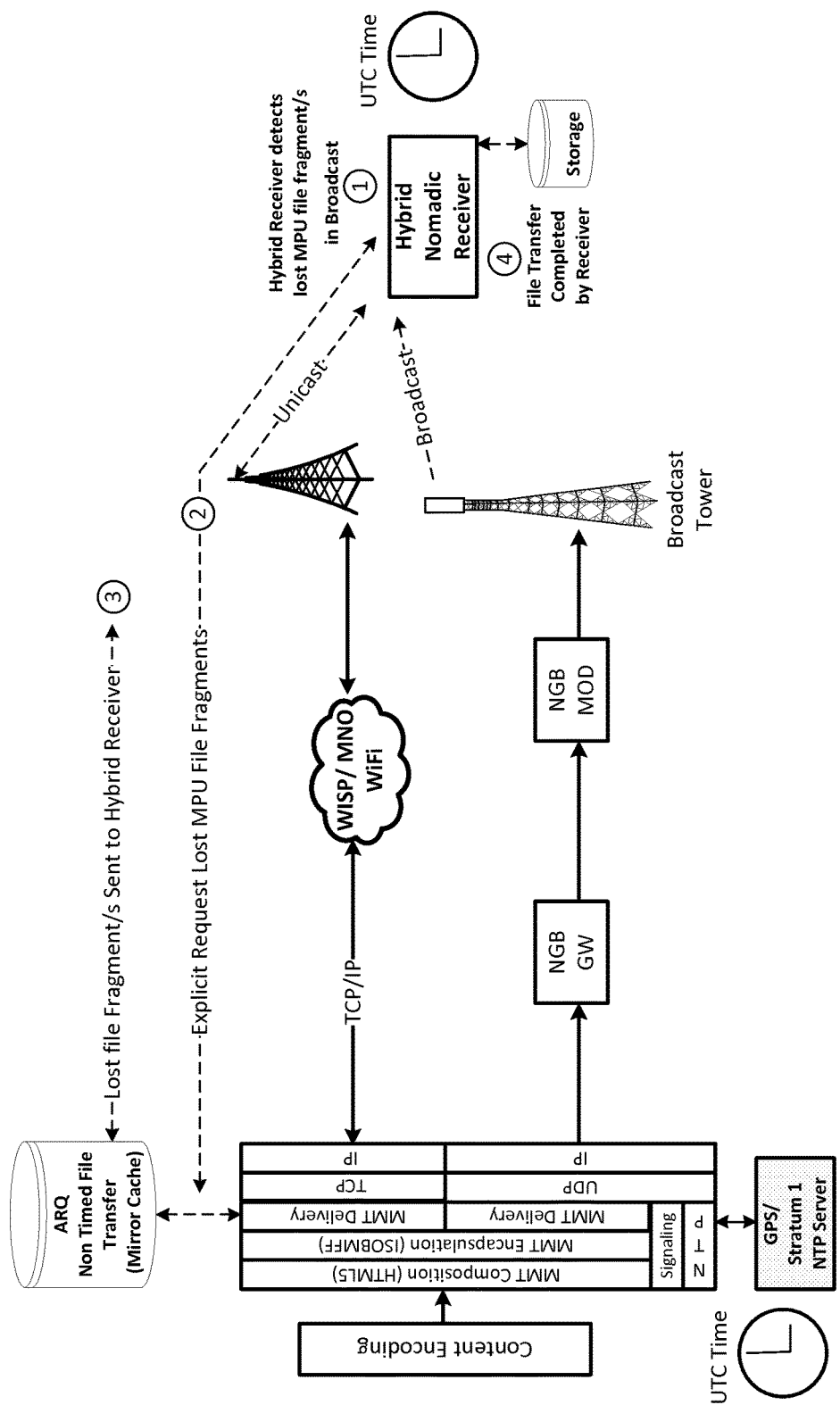
FIG. 13 shows augmentation channel for increasing QoS of non-timed media assets that are delivered for storage on client side for later playback.

FIG. 13 shows the first augmentation channel use case to be discussed. This involves increasing QoS of non-timed media assets that are delivered for storage on client side for later playback synchronous to UTC application layer transport timeline or asynchronously for consumption by user. Asynchronous consumption could be stored full length programs or movies with targeted ads inserted on playback and or personalized news, games etc. The stored media assets can also be removed from storage and played synchronously to the UTC presentation timeline as an element of a broadcast program under the new paradigm as previously mentioned. The problem to be solved here is that some fragments of media assets may arrive with noise induced errors in the broadcast channel that isn't corrected by the FEC in the receiver. This is a huge problem especially for data files were all bytes must be successfully received to complete a file download and or for the seamless presentation of multimedia assets stored. Therefore a method to guarantee error free media asset file fragment delivery is needed for stored assets without user intervention. The hybrid nomadic receiver shown has storage and the receiver can detect a missing file fragment this is shown as step 1. The file fragment missing can be explicitly identified at the receiver by using asset id and header information such as fragment count and the exact UTC time the missing asset was discovered. Step 2 the receiver explicitly request re-transmission of any missing fragments which are stored in a broadcast mirror cache at the application layer on server side. Step 3, the requested fragments are then sent via TCP/IP to receiver. The broadcast assets stored in mirror cache are available immediately after they are broadcast and for some period of time thereafter, seconds, minutes, hours or days (set by broadcaster) to allow the receiver ample time to retrieve missing fragments when receiver next enters a Wi-Fi hotspot if a permanent wireless connection isn't available (LTE). (longer retrieve times could be useful for movies delivered for later consumption) Step 4 the receiver uses missing media file fragments to complete the file transfer which would be absolutely required for a game or App downloaded. Being able to use broadcast one to many (potentially to millions of users) to deliver high demand content and or data or Apps just to mention a few becomes a huge opportunity. If a guarantee delivery without user intervention can be assured (by unicast and mechanism described) this opens many new opportunities for broadcast in the internet age. More specific a large file (GBytes) of high demand content can be broadcast and may only need a small number of fragments re-transmitted and this could take tremendous load off of the wireless (LTE) networks as one example. The interworking envisioned in the NGBP IP Core network under BMX can enable such possibilities that may become prudent business decisions in the future.

Figure 14:
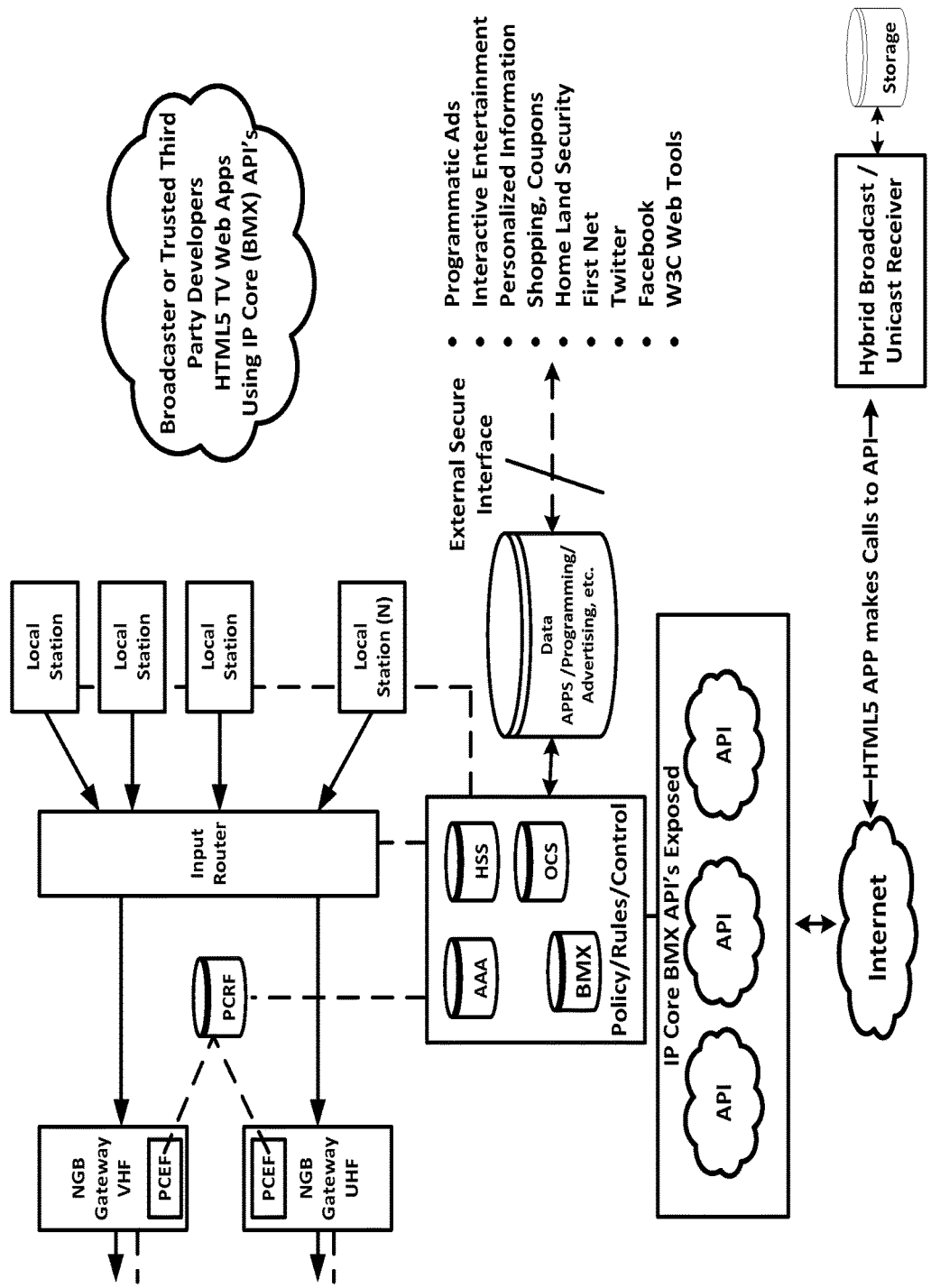
FIG. 14 diagram shows several use cases of NGBP IP Core network (BMX)

FIG. 14 includes a high level view of several potential use cases, some of which will be briefly described. This represent a paradigm shift for terrestrial broadcasting over heterogeneous networks in the internet age and is described so those skilled in the art may realize the utility of the IP Core network (BMX) invention. It has been described how timed and non-timed media assets can be delivered and presented by an HTML5 web browser client delivered over a next gen broadcast application layer transport in the internet age. Fully embracing W3C web tools in a new NGBP ecosystem to create a compelling user experience that keeps pace with the internet at a reasonable cost is the goal for broadcasting in the internet age. Broadcasters can then ride the rapid pace of technological innovation of the web. HTML5 treats video and audio as native elements (no plug-in) and offers rich new tools and a program environment including powerful HTML5 API's to enable web developers to create HTML5 Apps for the web. These tools and APIs can be found on W3C website or any number of books discussing HTML5 and will not be discussed in detail herein. We have created a NGBP with IP Core network that can fully leverage some of these HTML5 tools and enable a broadcaster and or trusted third party HTML5 developers to develop HTML5 NGBP TV Apps. These HTML5 Apps can be developed and tested and also may leverage the new exposed API's by BMX from intelligence in the databases of BMX. Also data can be pushed and stored in the IP Core over a trusted secure interface to enable the Apps to then call BMX API's from the client for data, and also to receive BMX network services like completion of App transactions (sales), etc. using back office interface of IP Core network. Also, customized applications can be developed by advertisers and or new forms of TV entertainment authored by TV producers with data stored in IP Core and or broadcast and cached on client device in advance. Let's assume a HTML5 NGBP TV web App is developed by a broadcaster and downloaded (broadcast/Unicast) to HTML5 client in receiver device with storage attached as shown. The user can then click on APP or it could it could be tightly integrated with content authored and trigger in broadcast stream and be displayed in a designed spatial/temporal asset area of display. The user can then interact with the app and or participate in new forms of social TV programming that could be personalized for you and your group of friends and include chat and or other forms of communications between friends. It really comes down to what is possible with software and web tools and the cloud today. An HTML5 TV App authored with Facebook and or Twitter API's could be used to more socialize TV and programming in the future. Also, programmatic ads could generate revenue for broadcasters. The secure interface and storage shown in IP Core could also enable advertisers to pre-load ad inventory for storage. Then real-time programmatic ads (bidding) through automation becomes possible in BMX by enabling local station spot availabilities to appear on the "Dash Board" of the programmatic buyer which uses basic web tools. The advertiser can buy and select time for commercial ad insertion with a click of mouse and this spot is then broadcast and unicast and cached and synchronously inserted in the programming UTC time line. Keeping their audiences entertained and safe (news and approaching weather) is at the heart of broadcasting for last 60 years. The interfaces shown to Home Land Security and of First Net could also enable new ways of keeping the public safe when mobile and an emergency is unfolding by authorities reaching people in harms-way using geo-tagged information as one example. Also, First Net could use NGBP network services to broadcast large encrypted content such as video and imagery for private public safety use. These are just some use case examples and many more is believed possible once the NGBP and BMX become well understood by potential users.

What is claimed is:

1. A system, comprising:
 a broadcast gateway located in an Internet Protocol (IP) core network, wherein the broadcast gateway is configured to:
  receive content from a plurality of content providers;
  generate a system timestamp based on a time signal; and
  generate a baseband signal including a user plane signal and a control plane signal, the user plane signal including the content from the plurality of content providers, and the control plane signal including the system timestamp; and
 a plurality of broadcast modulators located in a Single Frequency Network (SFN), wherein each broadcast modulator of the plurality of broadcast modulators is configured to:
  receive the baseband signal from the broadcast gateway;
  receive a clock pulse;
  generate a broadcast superframe by modeling of a physical layer based on the control plane signal of the baseband signal using a cross-layer control mechanism of the broadcast gateway; and transmit the broadcast superframe via a plurality of broadcast transmitters, wherein a start of transmission of the broadcast superframe is aligned with a rising edge of the clock pulse.

2. The system of claim 1, wherein the broadcast superframe is an Orthogonal Frequency Division Multiplexing (OFDM) frame.

3. The system of claim 1, wherein the broadcast gateway is further configured to add a known delay to the system timestamp to align the system timestamp with a time of the rising edge of the clock pulse and generate a calibrated system timestamp, and wherein the control plane signal includes the calibrated system timestamp.

4. The system of claim 3, wherein the broadcast superframe includes a first header, a second header, and a payload, the second header including the calibrated system timestamp.

5. The system of claim 4, wherein the broadcast modulator transmits the first header of the broadcast superframe before the second header, and transmits the second header of the broadcast superframe before the payload of the broadcast superframe.

6. The system of claim 1, wherein the broadcast gateway is further configured to receive the time signal from a Stratum 1 Network Timing Protocol (NTP) server.

7. The system of claim 1, wherein the broadcast gateway is coupled to a global positioning system (GPS) receiver, and the broadcast gateway is further configured to receive the time signal from the GPS receiver.

8. The system of claim 1, wherein the broadcast modulator is coupled to a global positioning system (GPS) receiver, and the clock pulse is a One Pulse Per Second (1PPS) signal received from the GPS receiver, and wherein the broadcast superframe has a duration of 1 second.

9. The system of claim 1, wherein the broadcast gateway is further configured to send the baseband signal as a universal datagram protocol (UDP) flow to the broadcast modulator.

10. The system of claim 1, wherein the content includes a plurality of IP flows, each IP flow of the plurality of IP flows being associated with a content provider of the plurality of content providers.

11. The system of claim 10, wherein the broadcast gateway is further configured to:
  determine a mapping of the plurality of IP flows to physical layer resources of the broadcast superframe, wherein the control plane signal further includes the mapping; and
  map the plurality of IP flows to Orthogonal Frequency Division Multiplexing (OFDM) subcarriers of the broadcast superframe based on the mapping.

12. A method, comprising:
  generating, at a broadcast gateway, a system timestamp from a time signal;
  receiving, at the broadcast gateway, content from a plurality of content providers;
  generating, at the broadcast gateway, a baseband signal including a user plane signal and a control plane signal, the user plane signal including content from a plurality of content providers, and the control plane signal including the system timestamp, wherein the control plane signal is decoupled from the user plane signal;
  generating, at a broadcast modulator of a plurality of broadcast modulators, a broadcast superframe by modeling of a physical layer based on the control plane signal of the baseband signal using a cross-layer control mechanism of the broadcast gateway;
  receiving, at the broadcast modulator, a clock pulse; and
  transmitting, from the broadcast modulator, the broadcast superframe, wherein the transmitting is aligned with a rising edge of the clock pulse,
  wherein the broadcast gateway is located in an Internet Protocol (IP) core network, and
  wherein the plurality of broadcast modulators are located in a Single Frequency Network (SFN).

13. The method of claim 12, further comprising adding, at the broadcast gateway, a known delay to the system timestamp to align the system timestamp with a time of the rising edge of the clock pulse; and generating, at the broadcast gateway, a calibrated timestamp, wherein the control plane signal includes the calibrated system timestamp.

14. The method of claim 13, wherein the broadcast superframe includes a first header, a second header, and a payload, the second header including the calibrated system timestamp.

15. The method of claim 14, further comprising: transmitting the first header of the broadcast superframe before the second header, and transmitting the second header of the broadcast superframe before the payload of the broadcast superframe.

16. The method of claim 12, wherein the broadcast superframe has a length of one second.

17. The method of claim 12, wherein the clock pulse is a One Pulse Per Second (1PPS) signal received from a global positioning system (GPS) receiver, and wherein the broadcast superframe has a duration of 1 second.

18. The method of claim 12, further comprising:
  receiving, at the broadcast gateway, a plurality of IP flows, each IP flow of the plurality of IP flows corresponding to a content provider of the plurality of content providers, and
  mapping, at the broadcast gateway, the plurality of IP flows to Orthogonal Frequency Division Multiplexing (OFDM) subcarriers of the broadcast superframe.

19. The method of claim 12, further comprising receiving the time signal from a global positioning system (GPS) receiver.

20. The method of claim 12, further comprising receiving the time signal from a Stratum 1 Network Timing Protocol (NTP) server.

* * * * *